UNITED STATES PATENT OFFICE.

PAUL JULIUS, OF LUDWIGSHAFEN, GERMANY, ASSIGNOR TO THE BADISCHE ANILIN AND SODA FABRIK, OF SAME PLACE.

BLUE-VIOLET MONOAZO DYE.

SPECIFICATION forming part of Letters Patent No. 654,065, dated July 17, 1900.

Application filed April 3, 1900. Serial No. 11,360. (No specimens.)

*To all whom it may concern:*

Be it known that I, PAUL JULIUS, doctor of philosophy, a subject of the Emperor of Austria-Hungary, residing at Ludwigshafen-on-the-Rhine, in the Kingdom of Bavaria, Empire of Germany, have invented new and useful Improvements in Monoazo Dyestuffs from Nitroamidophenolsulfo-Acid, of which the following is a specification.

The present invention relates to the manufacture of a new monoazo dye from nitro-amido-phenol-sulfoacid ($NO_2:OH:NH_2:SO_3H = 1.2.3.5$) and 2.8.6 amido-naphthol-sulfoacid, (gamma acid.) The new coloring-matter is a dark powder soluble in water with a blue-violet color. Its aqueous solution turns yellow red on the addition of hydrochloric acid. It dyes unmordanted wool in blue-violet shades, which on treatment with chromic acid, chromates, and chromium salts become practically black, and then possess a most excellent degree of fastness to light, milling, washing, and other influences.

The following example will serve to further illustrate the nature of this invention and how it may be carried into practical effect. The parts are by weight.

Example: Dissolve about two hundred and thirty-four (234) parts of ortho-nitro-ortho-amido-phenol-para-sulfoacid in about five thousand (5,000) parts of water and diazotize it at the ordinary temperature by the addition of one hundred and fifty (150) parts of hydrochloric acid (containing about thirty per cent. HCl) and a solution of sixty-nine (69) parts of sodium nitrite. Prepare a solution of about two hundred and forty (240) parts of 2.8.6 amido-naphthol-sulfoacid in about five thousand (5,000) parts of water to which an excess of soda has been added. Into this solution run in the diazo solution while stirring. When the combination is completed, add common salt, collect the precipitated coloring-matter by filtration, press, and dry.

Now what I claim is—

As a new product the monoazo dyestuff from nitro-amido-phenol-sulfoacid ($NO_2:OH:NH_2:SO_3H = 1:2:3:5$) and 2.8.6 amido-naphthol-sulfoacid which can be obtained by diazotizing the specified nitro-amido-phenol-sulfoacid and combining the diazo compound with 2.8.6 amido-naphthol-sulfoacid in alkaline solution and which is a dark powder soluble in water with a blue-violet color, changing to yellow red on the addition of hydrochloric acid, which dyes unmordanted wool blue-violet shades which turn to deep black on treatment with potassium-bichromate solution, substantially as described.

In testimony whereof I have hereunto set my hand in the presence of two subscribing witnesses.

PAUL JULIUS.

Witnesses:
ALEXANDER ALBRECHT,
JOHN L. HEINKE.